(12) United States Patent
Satou

(10) Patent No.: US 11,269,710 B2
(45) Date of Patent: Mar. 8, 2022

(54) DIAGNOSTIC APPARATUS

(71) Applicant: FANUC CORPORATION, Yamanashi (JP)

(72) Inventor: Kazuhiro Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 9 days.

(21) Appl. No.: 16/882,749

(22) Filed: May 26, 2020

(65) Prior Publication Data
US 2020/0394092 A1 Dec. 17, 2020

(30) Foreign Application Priority Data

Jun. 13, 2019 (JP) .............................. JP2019-110298

(51) Int. Cl.
*G06F 11/00* (2006.01)
*G06F 11/07* (2006.01)
*G06N 3/08* (2006.01)

(52) U.S. Cl.
CPC ........ *G06F 11/079* (2013.01); *G06F 11/0736* (2013.01); *G06F 11/0766* (2013.01); *G06N 3/08* (2013.01)

(58) Field of Classification Search
CPC ............... G06F 11/079; G06F 11/0736; G06F 11/0766; G05B 19/4184
See application file for complete search history.

(56) References Cited

U.S. PATENT DOCUMENTS

2018/0365089 A1 12/2018 Okanohara et al.
2020/0250475 A1* 8/2020 Ikeda .................. G06K 9/6284

FOREIGN PATENT DOCUMENTS

WO 2017094267 A1 6/2017

* cited by examiner

*Primary Examiner* — Philip Guyton
(74) *Attorney, Agent, or Firm* — Hauptman Ham, LLP

(57) ABSTRACT

A diagnostic apparatus acquires data relating to a state of a machine, performs preprocessing on the acquired data, and modifies the preprocessed data by using a statistic relating to the state of the machine. Then, the diagnostic apparatus performs a process of machine learning by an auto encoder on the basis of the modified data and learns or diagnoses the state of the machine. Thus, this diagnostic apparatus provides a learning and inference method capable of uniformly handling a scale of data indicating a feature.

6 Claims, 5 Drawing Sheets

TRAINING DATA $T_1$=(STATE DATA $S_1$)
$= (s_{11}, s_{12}, s_{13}, \cdots, s_{1m})$ TRAINING DATA $T_2$=(STATE DATA $S_2$)
$= (s_{21}, s_{22}, s_{23}, \cdots, s_{2m})$

⋮

TRAINING DATA $T_k$=(STATE DATA $S_k$)
$= (s_{k1}, s_{k2}, s_{k3}, \cdots, s_{km})$ AVERAGE VALUE $\mu(i) = (s_{1i} + s_{2i} + \cdots + s_{ki})/k$ STANDARD DEVIATION VALUE $\sigma(i) = \sqrt{1/k \sum_{j=1}^{k} (s_{ji} - \mu(i))2}$

DIAGNOSTIC APPARATUS

RELATED APPLICATIONS

The present application claims priority to Japanese Patent Application Number 2019-110298 filed Jun. 13, 2019, the disclosure of which is hereby incorporated by reference herein in its entirety.

BACKGROUND OF THE INVENTION

1. Field of the Invention

The present invention relates to a diagnostic apparatus.

2. Description of the Related Art

Industrial machines, such as machine tools and robots, are installed at manufacturing sites such as factories, and operators operate these industrial machines to manufacture products. If the industrial machine continues to operate at the manufacturing site, an abnormality in the operation of the industrial machine may occur due to external factors such as aging of components constituting the industrial machine, changes in outside air temperatures, vibrations, or mistakes made by the operator. In a case where it is diagnosed that an abnormality has occurred in the operation of the industrial machine, the operator stops the operation of the industrial machine in which the abnormality has occurred, removes the cause of the abnormality, resumes the operation of the industrial machine, and continues the operation.

As a method of diagnosing a state of an industrial machine, there is known a method of creating a model used for a predetermined diagnosis of the industrial machine and performing a diagnosis based on data acquired from the industrial machine using the created model. Regression formulas, a support vector machine (SVM), neural networks, and the like are used as models for diagnosing the state, and there is also known a technique of building an auto encoder with a neural network and using the auto encoder as a model (for example, see WO 2017/094267).

When a model for diagnosing the state of an industrial machine is built, the model is built using, as a feature amount, time-series data of physical quantities acquired from the industrial machine or a sensor attached to the industrial machine during the operation of the industrial machine. Additionally, when the state of the industrial machine is diagnosed, a diagnostic process is executed using the physical quantities acquired from the industrial machine or a sensor attached to the industrial machine and the model to be used for the diagnosis during the operation of the industrial machine.

However, in a case where an auto encoder is used as a model for diagnosing the state of the industrial machine, feature parts having a small scale such as a displacement or the like included in the time-series data of the physical quantities acquired from the industrial machine or the sensor attached to the industrial machine may not be fully learned. For example, in a case where a frequency component analysis of the time-series data is performed and amplitude values at several frequencies that can be important features indicating a sign of the state are used as learning data, frequencies with small amplitude values may not be reflected in the model. However, the presence or absence of such a frequency component having a small amplitude value may be an important feature in diagnosing the state of the industrial machine, and in such a case, handling of small-scale data becomes an issue. Such a problem also occurs even if models such as a variational autoencoder (VAE), an adversarial autoencoder (AAE), a ladder variational autoencoder (LVAE), and auxiliary deep generative models (ADGM) are used.

SUMMARY OF THE INVENTION

Therefore, a learning and inference method capable of uniformly handling the scale of data indicating a feature is desired.

A diagnostic apparatus of the present invention solves the above-described problem by performing learning and inference of an auto encoder on the basis of data subjected to normalization that makes a distribution uniform for each feature amount.

A diagnostic apparatus according to an aspect of the present invention diagnoses a state of a machine, and includes a data acquisition unit, a pre-processing unit, and a modification unit. The data acquisition unit acquires data related to the state of the machine. The pre-processing unit preprocesses the data acquired by the data acquisition unit. The modification unit uses a statistic related to the state of the machine to modify the data preprocessed by the pre-processing unit. Then, a process of machine learning by the auto encoder is performed on the basis of the data modified by the modification unit, and the state of the machine is learned or diagnosed.

The diagnostic apparatus may further include a statistic calculation unit, a learning unit, and a learning model storage unit. The statistic calculation unit calculates a statistic related to the data preprocessed by the pre-processing unit. The learning unit uses the data after modification by the modification unit to learn the state of the machine through machine learning by the auto encoder and generate a learning model. The learning model storage unit stores the learning model and the statistic in association with each other. Then, the modification unit uses the statistic calculated by the statistic calculation unit to modify the data preprocessed by the pre-processing unit.

The diagnostic apparatus may further include a learning model storage unit and a diagnostic unit. The learning model storage unit stores the learning model that has learned the state of the machine by the auto encoder and the statistic of data used for the learning in association with each other. The diagnostic unit diagnoses the state of the machine using the learning model stored in the learning model storage unit on the basis of the data after modification by the modification unit. Then, the modification unit uses the statistic stored in the learning model storage unit to modify the data preprocessed by the pre-processing unit.

The pre-processing unit may perform a frequency analysis on the time-series data in the data acquired by the data acquisition unit as preprocessing.

The diagnostic unit may further include a reverse modification unit that outputs, together with a diagnosis result, the data after modification used for the diagnosis and performs a reverse conversion of the modification performed by the modification unit on the data after modification that has been output by the diagnostic unit.

The modification by the modification unit may be a modification that expands, for each frequency component of the time-series data, a range of possible values that an amplitude value of the frequency component can take.

Since the present invention has the above configuration, it is possible to sufficiently learn even a feature amount having a small range of values that original data can take by eliminating the bias of a distribution for each feature amount, and it is possible to expect improvement in the accuracy of the diagnosis on the state of industrial machines.

DETAILED DESCRIPTION OF THE PREFERRED EMBODIMENTS

Figure 1:
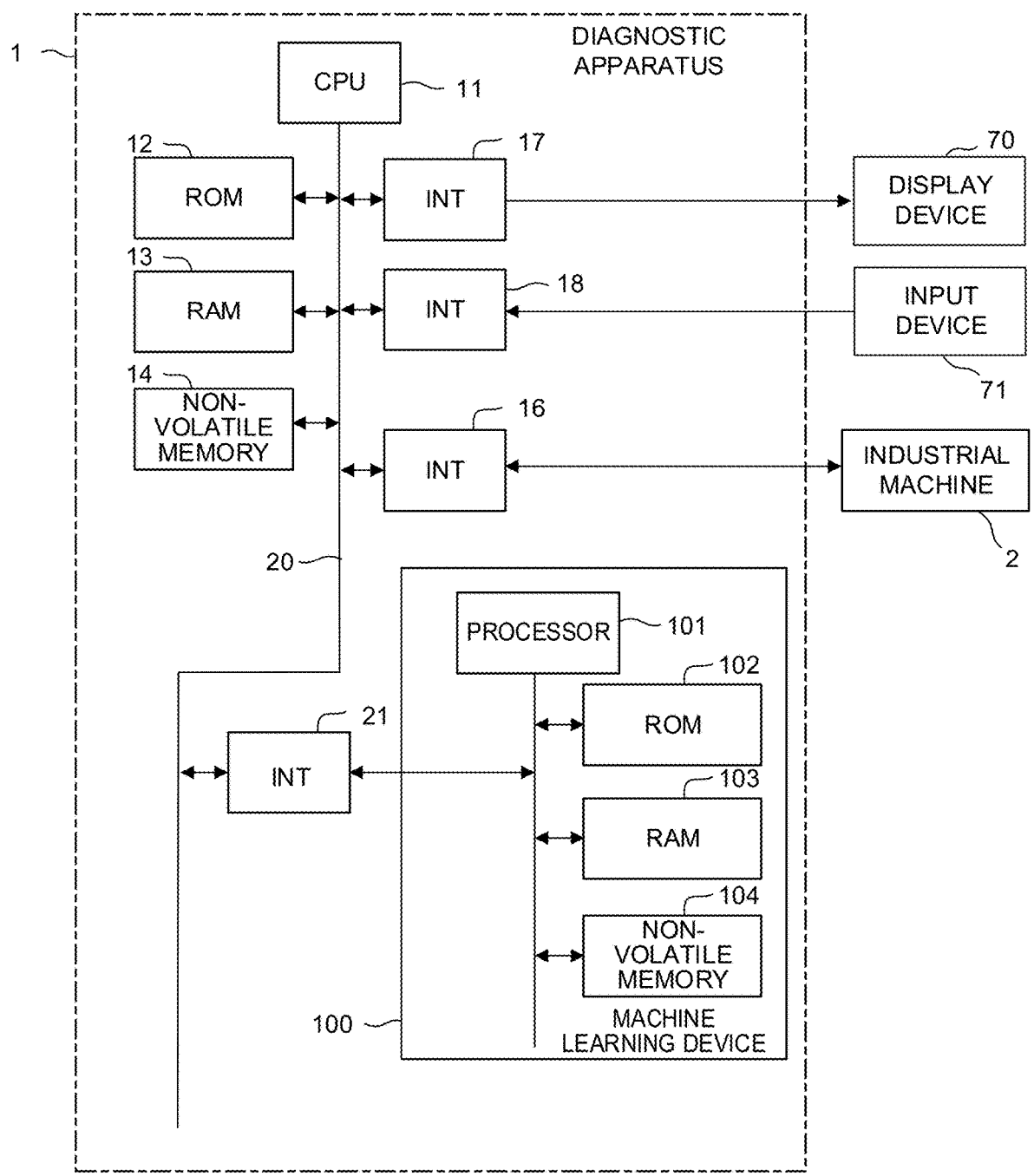
FIG. 1 is a schematic hardware configuration diagram of a diagnostic apparatus according to an embodiment.

FIG. 1 is a schematic hardware configuration diagram showing a main part of a diagnostic apparatus including a machine learning device according to an embodiment.

Additionally, a diagnostic apparatus 1 of the present embodiment can be implemented on, for example, a controller for controlling an industrial machine, or can be implemented as a personal computer provided together with the controller for controlling an industrial machine, or a computer such as an edge computer, a cell computer, a host computer, a cloud server, or the like that is connected to the controller via a wired or wireless communication network. In the present embodiment, an example in which the diagnostic apparatus 1 is implemented as a personal computer provided together with a controller configured to controls an industrial machine 2 will be shown.

A central processing unit (CPU) 11 included in the diagnostic apparatus 1 according to the present embodiment is a processor configured to control the diagnostic apparatus 1 as a whole. The CPU 11 is configured to read a system program stored in a read-only memory (ROM) 12 via a bus 20, and control the whole of the diagnostic apparatus 1 according to the system program. A random access memory (RAM) 13 is configured to temporarily store temporary calculation data, various data input by an operator via an input device 71, and the like.

A non-volatile memory 14 includes, for example, a memory backed up by a battery (not shown), a solid state drive (SSD), and the like, and is configured to retain a storage state even when the power of the diagnostic apparatus 1 is turned off. The non-volatile memory 14 stores a setting area in which setting information relating to the operation of the diagnostic apparatus 1 is stored, data input from the input device 71 (such as data indicating an operation state of the industrial machine 2), and time-series data of various data (position, speed, acceleration of a driving motor of the industrial machine 2, sound, vibrations, temperature, and the like detected by a sensor attached to the industrial machine 2) acquired from the industrial machine 2, an external storage device (not shown), and data read via a network, and the like. Programs and the various data stored in the non-volatile memory 14 may be expanded in the RAM 13 at the time of execution or use. Additionally, in the ROM 12, a system program including a publicly known analysis program for analyzing the various data, a program for controlling exchange with a machine learning device 100 to be described later, and the like are written in advance.

The industrial machine 2 is a machine such as a machine tool, an electric discharge machine, an injection molding machine, a transfer machine, or a robot used at a manufacturing site. The industrial machine 2 includes a function to output each piece of data (position, speed, acceleration, and the like of the driving motor) that can be detected during operation, and each piece of data (sound, vibrations, temperature, and the like) detected by the sensor (not shown) attached to the industrial machine 2.

In a display device 70, each piece of data read on the memory, data acquired as a result of executing a program or the like, data output from the machine learning device 100 to be described later, and the like are output via an interface 17 and are displayed. Additionally, the input device 71 including a keyboard, a pointing device, and the like passes a command, data, and the like based on operations performed by an operator to the CPU 11 via an interface 18.

An interface 21 is an interface for connecting the CPU 11 and the machine learning device 100. The machine learning device 100 includes a processor 101 configured to control the whole of the machine learning device 100, the ROM 102 storing a system program and the like, a RAM 103 for temporarily storing each process related to the machine learning, and a non-volatile memory 104 used for storage of the learning model and the like. The machine learning device 100 can observe each piece of information that can be acquired by the diagnostic apparatus 1 via the interface 21 (e.g., data indicating the operation state of the industrial machine 2, the position, speed, and acceleration of the drive motor of the industrial machine 2, and the time-series data of various physical quantities such as sound, vibrations, temperature, and the like detected by the sensor attached to the industrial machine 2. Additionally, the diagnostic apparatus 1 is configured to acquire a process result output from the machine learning device 100 via the interface 21 and store, display, or transmit the acquired process result to another device via a network or the like.

Figure 2:
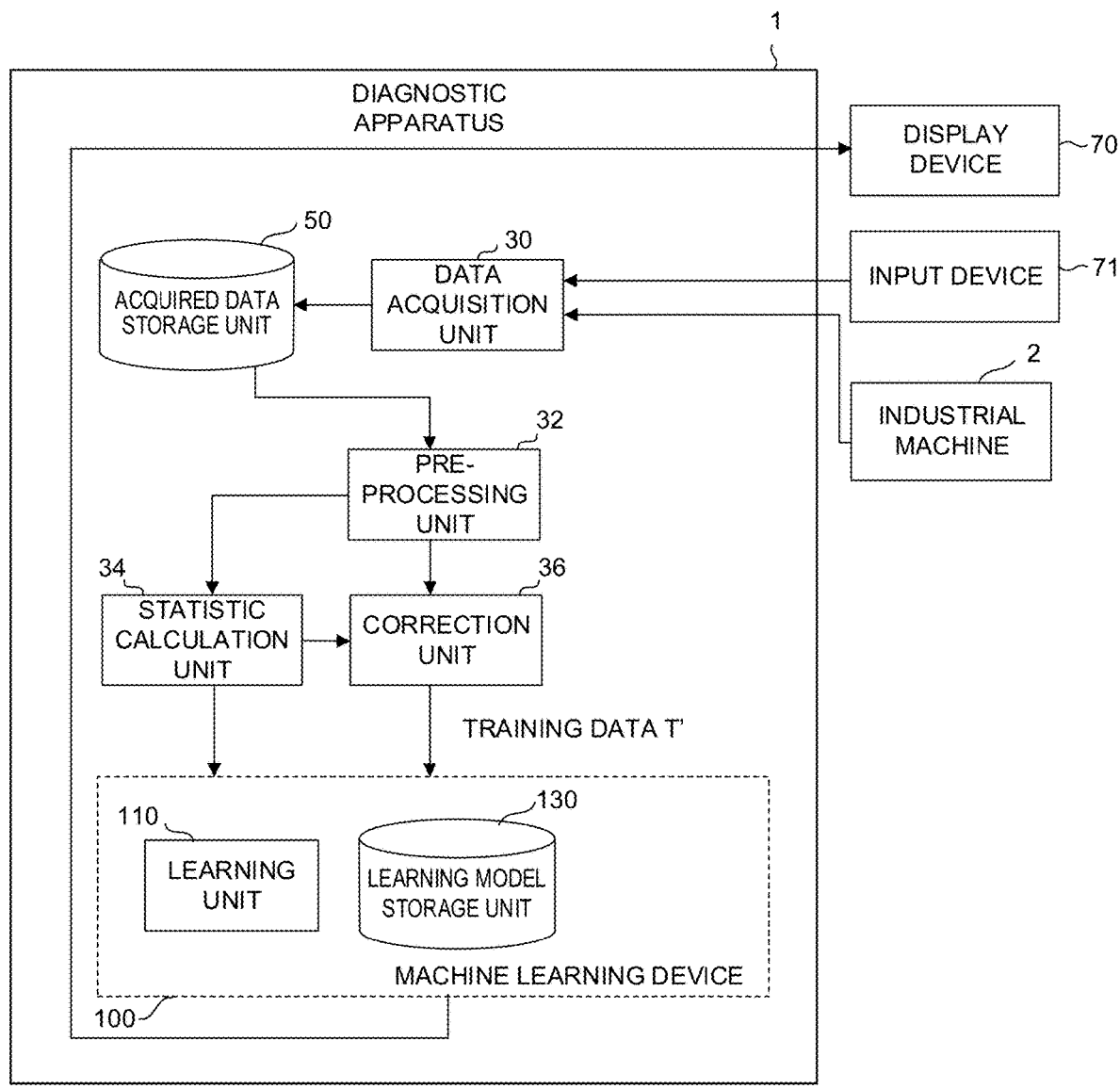
FIG. 2 is a schematic functional block diagram of a diagnostic apparatus according to a first embodiment.

FIG. 2 is a schematic functional block diagram of a diagnostic apparatus 1 and a machine learning device 100 according to the first embodiment.

The diagnostic apparatus 1 of the present embodiment has a configuration required in a case where the machine learning device 100 learns the operation state of the machine tool (learning mode). Each of functional blocks shown in FIG. 2 is implemented by a CPU 11 included in the diagnostic apparatus 1 shown in FIG. 1 and a processor 101 of the machine learning device 100 which execute respective system programs and control the operation of each unit of the diagnostic apparatus 1 and the machine learning device 100.

The diagnostic apparatus 1 according to the present embodiment includes a data acquisition unit 30, a preprocessing unit 32, a statistic calculation unit 34, and a modification unit 36, and the machine learning device 100 included in the diagnostic apparatus 1 includes a learning unit 110. Additionally, on a non-volatile memory 14 shown in FIG. 1, an acquired data storage unit 50 configured to store data acquired from the industrial machine 2 or the like is provided. On a non-volatile memory 104 of the machine learning device 100 shown in FIG. 1, a learning model storage unit 130 configured to store a learning model built through machine learning by the learning unit 110 is provided.

The data acquisition unit 30 is implemented by the CPU 11, included in the diagnostic apparatus 1 shown in FIG. 1, which executes a system program read from the ROM 12 and mainly performs arithmetic processing using the RAM 13 and the non-volatile memory 14. The data acquisition unit 30 acquires data related to the operation state acquired from the industrial machine 2, data indicating the operation state of the industrial machine 2 acquired from the input device 71, and the like and cause the acquired data storage unit 50 to store the acquired data and the like. The data acquisition unit 30 acquires data relating to a specific operation state of the industrial machine 2 and cause the acquired data storage unit 50 to store the acquired data as acquired data. For example, in a case where it is desired to diagnose a normal operation or abnormal operation of the industrial machine 2 in the diagnostic apparatus 1, the data acquisition unit 30 acquires data during the normal operation of the industrial machine 2 and causes the acquired data storage unit 50 to store the acquired data as acquired data.

The pre-processing unit 32 is implemented by the CPU 11, included in the diagnostic apparatus 1 shown in FIG. 1, which executes the system program read from the ROM 12 and mainly performs arithmetic processing using the RAM 13 and the non-volatile memory 14. The pre-processing unit 32 creates data indicating a feature amount to be used for a diagnosis of the state of the industrial machine 2 by the machine learning device 100 on the basis of the data acquired by the data acquisition unit 30. Then, the pre-processing unit 32 creates data acquired by converting (digitizing, sampling, and the like) the data acquired by the data acquisition unit 30 (and stored in the acquired data storage unit 52) into a unified format handled by the machine learning device 100, and outputting the created data to the machine learning device 100. For example, the pre-processing unit 32 may perform a frequency analysis of time-series data and extract an amplitude value of a frequency component as a feature amount when creating each piece of data indicating the feature amount. In such case, one or a plurality of predetermined frequency components may be extracted as a feature amount. In a case where the machine learning device 100 diagnoses the operation state of the industrial machine 2, the pre-processing unit 32 according to the present embodiment creates state data S (data indicating a series of feature amounts) of a predetermined format in the learning as training data T.

The statistic calculation unit 34 is implemented by the CPU 11, included in the diagnostic apparatus 1 shown in FIG. 1, which executes the system program read from the ROM 12 and mainly performs arithmetic processing using the RAM 13 and the non-volatile memory 14. For a plurality of the training data T acquired by converting by the pre-processing unit 32 the data acquired by the acquisition unit, the statistic calculation unit 34 calculates statistics such as an average, a variance, a standard deviation, and a maximum value, and a minimum value for each feature amount included in the training data T.

Figure 3:
FIG. 3 is a diagram showing a calculation example of a statistic.

As shown in FIG. 3, for example, in a case where there are k pieces of training data $T_1=(s_{11}, s_{12}, \ldots, \text{and } s_{1m})$, $T_2=(s_{21}, s_{22}, \ldots, \text{and } s_{2m}) \ldots$, and $T_k=(S_{k1}, S_{k2}, \ldots, \text{and } s_{km})$ as the training data used for learning in the machine learning device 100, the statistic calculation unit 34 calculates a mean value $\mu(i)$ and a standard deviation value $\sigma(i)$ for each feature amount of the same type. The statistic calculation unit 34 outputs the calculated statistic to the modification unit 36 and also outputs the calculated statistic to the machine learning device 100 so that the calculated statistic is stored in the learning model storage unit 130 in association with a learning model generated by performing machine learning on the basis of training data T' acquired by modifying the training data T. The statistic calculated by the statistic calculation unit 34 may be any statistic as long as the statistic can be used for modification of the feature amount by the modification unit 36.

The modification unit 36 is implemented by the CPU 11, included in the diagnostic apparatus 1 shown in FIG. 1, which executes a system program read from the ROM 12 and mainly performs arithmetic processing using the RAM 13 and the non-volatile memory 14. The modification unit 36 is configured to use the statistic calculated by the statistic calculation unit 34 to modify the feature amount included in the training data T created by the pre-processing unit 32. The modification unit 36 uses, for example, equation (1) shown below to modify each feature amount. In equation (1), $\mu(i)$ is an average value of feature amounts $s_{1i}$ to $s_{ki}$, $\sigma(i)$ is a standard deviation value of the feature amount $s_{1i}$ to $s_{ki}$, $s_{ji}$ is the i-th feature amount of training data $T_j$, and $s_{ji}'$ is the i-th feature amount of the training data $T_j$ after modification.

$$s_{ji}' = \frac{s_{ji} - \mu(i)}{\sigma(i)} \tag{1}$$

The modification exemplified in equation (1) is performed for each feature amount, whereby each feature amount is modified so that in a case where a range of values that can be taken for a certain type of feature amount is small, the range of the values is expanded. Note that when the standard deviation value $\sigma(i)$ in equation (1) is small, a change in an extremely small feature amount is greatly enlarged, so that noise resistance may deteriorate. In such a case, when a calculation is performed using equation (1), a modification method may be appropriately adjusted. For example, a predetermined constant s is added to the standard deviation value $\sigma(i)$ or in a case where the standard deviation value $\sigma(i)$ is smaller than a threshold value Th that is predetermined, the standard deviation value $\sigma(i)$ in the equation (1) is replaced with the threshold value Th.

Note that the modification of the feature amount by the modification unit 36 is not limited to the above equation (1), and any modification method may be employed as long as the modification method is capable of, in a case where there is a feature amount having a small change range as compared with other feature amounts, expanding the change range of the feature amount on the basis of the statistic.

The learning unit 110 is implemented by the processor 101, included in the diagnostic apparatus 1 shown in FIG. 1, which executes a system program read from a ROM 102 and mainly performs arithmetic processing using a RAM 103 and the non-volatile memory 104. The learning unit 110 is configured to perform machine learning using the training data T' modified by the modification unit 36. The learning unit 110 performs machine learning using publicly known auto encoder technology, thereby generating a learning model that has learned state data S' included in the training data T' modified by the modification unit 36 and storing the learning model in the learning model storage unit 130. The learning model storage unit 130 stores the generated learning model and the statistic related to the training data used when the learning model is generated in association with each other.

Note that the learning unit 110 in the machine learning device 100 is an indispensable configuration in a learning stage, but is not necessarily an indispensable configuration after the learning unit 110 completes the learning of the state of the industrial machine 2. For example, in a case where the machine learning device 100 that has completed the learning is shipped to a customer, the machine learning device 100 may be shipped with the learning unit 110 removed therefrom.

The diagnostic apparatus 1 according to the present embodiment having the above-described configuration generates the learning model that has learned the state of the industrial machine 2. Then, using the learning model generated in this manner, a diagnostic unit 120 to be described later becomes capable of diagnosing the current state of the industrial machine 2 on the basis of the state data S acquired from the industrial machine 2. Additionally, in the diagnostic apparatus 1 according to the present embodiment, each feature amount included in the state data used at the time of the diagnosis is modified by the modification unit 36, whereby a displacement width of a feature amount having a small displacement value is expanded, and the state data after the modification by the modification unit 36 can be used for the diagnosis of the state of the industrial machine 2. Therefore, the reproducibility of output data with respect to input data in the auto encoder can be particularly improved, and the accuracy of the diagnosis of the state of the industrial machine 2 can be expected to be improved.

Figure 4:
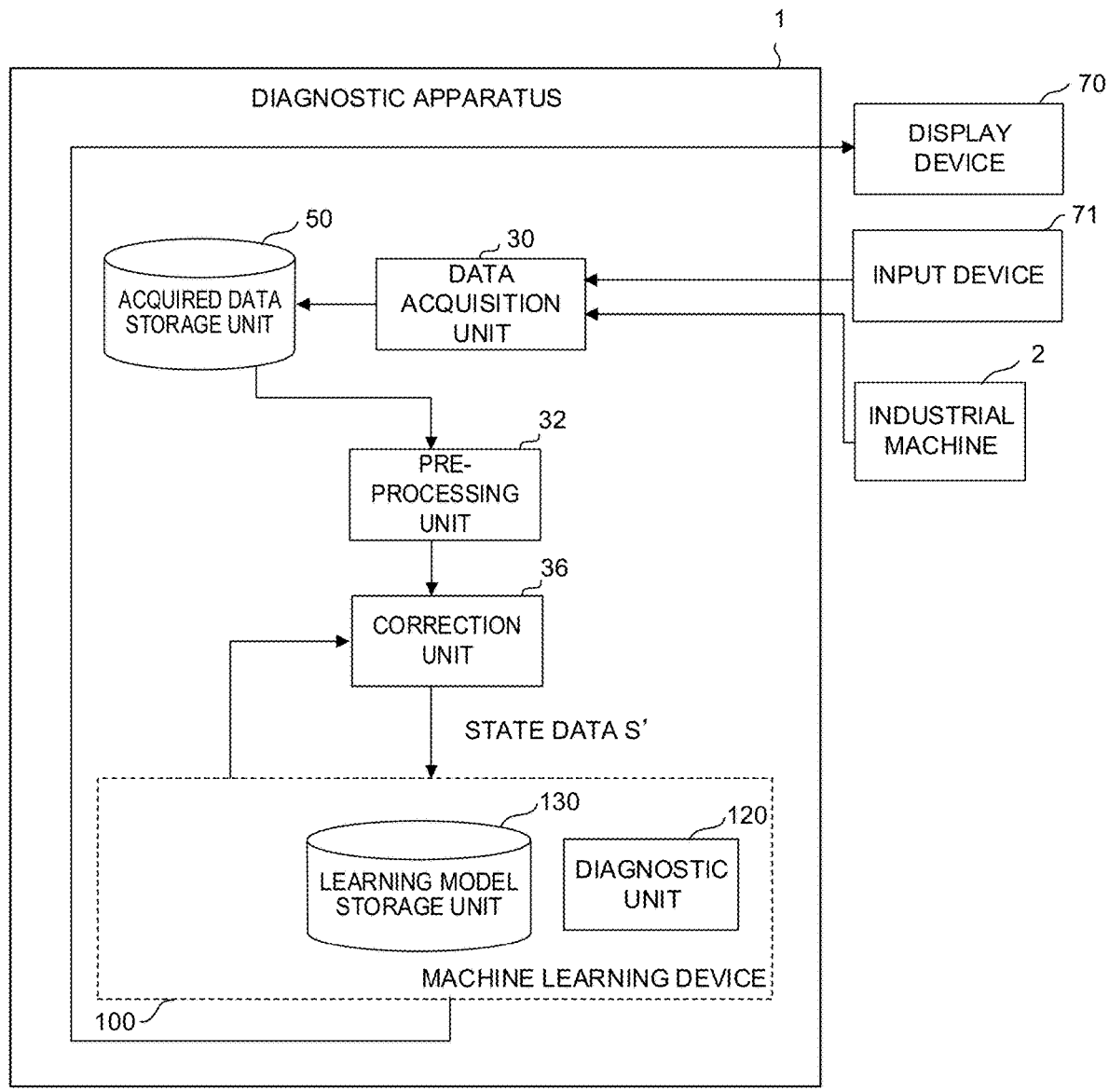
FIG. 4 is a schematic functional block diagram of a diagnostic apparatus according to a second embodiment.

FIG. 4 is a schematic functional block diagram of a diagnostic apparatus 1 and a machine learning device 100 according to a second embodiment.

The diagnostic apparatus 1 of the present embodiment has a configuration required in a case where the machine learning device 100 diagnoses an operation state of an industrial machine 2 (diagnostic mode). Each of functional blocks shown in FIG. 4 is implemented by a CPU 11 included in the diagnostic apparatus 1 shown in FIG. 1 and a processor 101 of the machine learning device 100, which execute respective system programs and control the operation of each unit of the diagnostic apparatus 1 and the machine learning device 100.

The diagnostic apparatus 1 according to the present embodiment includes a data acquisition unit 30, a pre-processing unit 32, and a modification unit 36, and the machine learning device 100 included in the diagnostic apparatus 1 includes a diagnostic unit 120. Additionally, on a non-volatile memory 14 shown in FIG. 1, an acquired data storage unit 50 configured to store data acquired from the industrial machine 2 or the like is provided. On a non-volatile memory 104 of the machine learning device 100 shown in FIG. 1, a learning model storage unit 130 configured to store a learning model built through machine learning by a learning unit 110 described in the first embodiment is provided.

The data acquisition unit 30 and the pre-processing unit 32 according to the present embodiment have functions similar to those of the data acquisition unit 30 and the pre-processing unit 32 in the first embodiment. Additionally, the modification unit 36 according to the present embodiment has a function similar to the function of the modification unit 36 in the first embodiment, except that the modification unit 36 according to the present embodiment is configured to acquire a statistical value from the learning model storage unit 130 included in the machine learning device 100.

The diagnostic unit 120 is implemented by the processor 101, included in the diagnostic apparatus 1 shown in FIG. 1, which executes a system program read from a ROM 102 and mainly performs arithmetic processing using a RAM 103 and the non-volatile memory 104. The diagnostic unit 120 is configured to diagnose the operation state of the industrial machine 2 using a learning model stored in the learning model storage unit 130 on the basis of state data S' modified by the modification unit 36. In the diagnostic unit 120 of the present embodiment, the state data S' modified by the modification unit 36 is input in the learning model generated (having parameters determined) by the learning unit 110, and the input data is compared with data output from the learning model, whereby the operation state of the industrial machine 2 is diagnosed. Additionally, the state of the industrial machine 2 diagnosed by the diagnostic unit 120 may be displayed and output to a display device 70 or transmitted and output to another device via a network or the like.

In a case where machine learning is performed on an auto encoder using training data acquired in a predetermined state, when data acquired in the predetermined state is input in a generated learning model (auto encoder), the generated learning model outputs the same data as the input data, but when data acquired in another state different from the predetermined state is input in the generated learning model, the generated learning model outputs data different from the input data. Therefore, for example, if data acquired when the industrial machine 2 is in a normal state is input in a learning model generated by performing machine learning using data acquired in a normal state by the industrial machine 2 as training data, the learning model outputs the same data as the input data, whereas if data acquired when the industrial machine 2 is not in a normal state (that is, in an abnormal state) is input in the learning model, the learning model outputs data different from the input data. Therefore, the learning model generated by performing machine learning using the data acquired in a normal state of the industrial machine 2 is stored in advance as training data in the learning model storage unit 130, whereby the diagnostic unit 120 is capable of diagnosing whether the industrial machine 2 is in a normal state or an abnormal state.

The diagnostic apparatus 1 according to the present embodiment having the above-described configuration uses the learning model that has learned the state of the industrial machine 2, thereby being able to distinguish and diagnose the learned state and other states. For example, it is possible to diagnose a normal state and an abnormal state of the industrial machine 2 by using a learning model generated by using training data acquired during a normal operation of the industrial machine 2. Additionally, the diagnostic apparatus 1 according to the present embodiment, each feature amount included in the state data used at the time of the diagnosis is modified by the modification unit 36, whereby a displacement width of a feature amount having a small displacement value is expanded, and the state data after the modification by the modification unit 36 can be used for the diagnosis of the state of the industrial machine 2. Therefore, the reproducibility of output data with respect to input data in the auto encoder can be particularly improved, and the accuracy of the diagnosis of the state of the industrial machine 2 can be expected to be improved.

Figure 5:
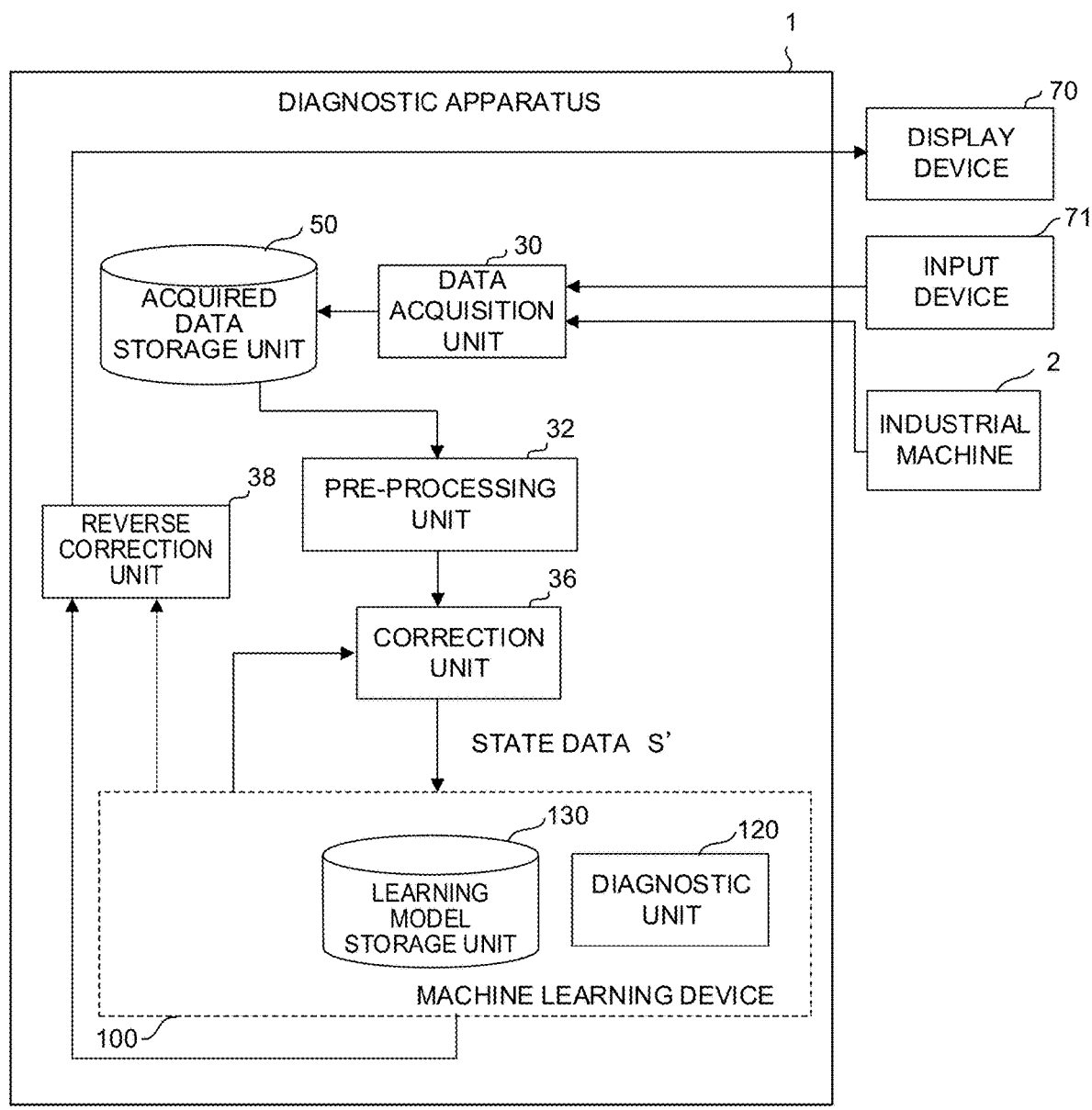
FIG. 5 is a schematic functional block diagram of a diagnostic apparatus according to a third embodiment.

FIG. 5 is a schematic functional block diagram of a diagnostic apparatus 1 and a machine learning device 100 according to a third embodiment.

The diagnostic apparatus 1 of the present embodiment has a configuration required in a case where the machine learning device 100 diagnoses an operation state of an industrial machine 2 (diagnostic mode). Each of functional blocks shown in FIG. 5 is implemented by a CPU 11, included in the diagnostic apparatus 1 shown in FIG. 1 and a processor 101 of the machine learning device 100, which executes respective system programs and controls the operation of each unit of the diagnostic apparatus 1 and the machine learning device 100.

The diagnostic apparatus 1 of the present embodiment includes a data acquisition unit 30, a pre-processing unit 32, a modification unit 36, and a reverse modification unit 38, and the machine learning device 100 included in the diagnostic apparatus 1 includes a diagnostic unit 120. Additionally, on a non-volatile memory 14 shown in FIG. 1, an acquired data storage unit 50 configured to store data acquired from the industrial machine 2 or the like is provided. On a non-volatile memory 104 of the machine learning device 100 shown in FIG. 1, a learning model storage unit 130 configured to store a learning model built through machine learning by a learning unit 110 described in the first embodiment is provided.

The data acquisition unit 30, the pre-processing unit 32, and the modification unit 36 according to the present embodiment have functions similar to functions of the data acquisition unit 30, the pre-processing unit 32, and the modification unit 36 according to the second embodiment. Additionally, the diagnostic unit 120 according to the present embodiment has a function similar to that of the diagnostic unit 120 according to the second embodiment, except that the diagnostic unit 120 according to the present embodiment is configured to output state data used for diagnosis, in addition to a diagnostic result of a state of the industrial machine 2, to the reverse modification unit 38.

The reverse modification unit 38 according to the present embodiment is implemented by the CPU 11, included in the diagnostic apparatus 1 shown in FIG. 1, which executes a system program read from a ROM 12 and mainly performs arithmetic processing using a RAM 13 and a non-volatile memory 14. The reverse modification unit 38 is configured to perform modification reverse to the modification performed by the modification unit 36 on the state data input together with the diagnosis result of the state of the industrial machine 2 from the diagnostic unit. Since data modified by the modification unit 36 has a form different from a form of the data acquired from the industrial machine 2, it may be difficult to understand even if the data is displayed and output to an operator. Therefore, the reverse modification unit 38 performs the modification reverse to the modification performed by the modification unit 36, whereby the data can be displayed as data in a format easy to understand for the operator. Note that the reverse modification unit 38 may further perform processing reverse to preprocessing performed by the pre-processing unit 32 on the data.

As described above, the embodiments of the present invention have been described, but the present invention is not limited to the above-described embodiments, and can be implemented in various aspects by adding appropriate changes.

For example, in the above-described embodiments, the diagnostic apparatus 1 and the machine learning device 100 are described as devices having different CPUs (processors). However, the machine learning device 100 may be achieved by the CPU 11 included in the diagnostic apparatus 1 and the system program stored in the ROM 12.

The invention claimed is:

1. A diagnostic apparatus that diagnoses a state of a machine; the diagnostic apparatus comprising:
    a data acquisition unit that acquires data related to the state of the machine;
    a pre-processing unit that preprocesses the data acquired by the data acquisition unit; and
    a modification unit that uses a statistic related to the state of the machine to modify the data preprocessed by the pre-processing unit,
    wherein a process of machine learning by an auto encoder is performed on a basis of the data modified by the modification unit, and the state of the machine is learned or diagnosed, and
    the modification by the modification unit is modification that expands, for each frequency component of the time-series data, a range of possible values that an amplitude value of the frequency component can take.

2. The diagnostic apparatus according to claim 1, further comprising:
    a statistic calculation unit that calculates a statistic related to the data preprocessed by the pre-processing unit;
    a learning unit that uses the data after modification by the modification unit to learn the state of the machine through the machine learning by the auto encoder and generate a learning model; and
    a learning model storage unit that stores the learning model and the statistic in association with each other,
    wherein the modification unit is configured to use the statistic calculated by the statistic calculation unit to modify the data preprocessed by the pre-processing unit.

3. The diagnostic apparatus according to claim 1, further comprising:
    a learning model storage unit that stores a learning model that has learned the state of the machine by the auto encoder and a statistic of data used for the learning in association with each other; and
    a diagnostic unit that diagnoses the state of the machine using the learning model stored in the learning model storage unit on the basis of the data after modification by the modification unit,
    wherein the modification unit uses the statistic stored in the learning model storage unit to modify the data preprocessed by the pre-processing unit.

4. The diagnostic apparatus according to claim 1, wherein the pre-processing unit performs a frequency analysis on the time-series data in the data acquired by the data acquisition unit as preprocessing.

5. The diagnostic apparatus according to claim 3, wherein the diagnostic unit further includes a reverse modification unit that outputs, together with a diagnosis result, the data after modification used for the diagnosis, the reverse modification unit performing a reverse conversion of the modification performed by the modification unit on the data after modification that has been output by the diagnostic unit.

6. A diagnostic apparatus for diagnosing a state of a machine, the diagnostic apparatus comprising:
    a processor configured to
        acquire data related to the state of the machine,
        preprocess the acquired data, and
        use a statistic related to the state of the machine to modify the preprocessed data,
        perform a process of machine learning by an auto encoder on a basis of the modified data, and
        learn or diagnose the state of the machine,
    wherein the processor is configured to modify the preprocessed data to expand, for each frequency component of time-series data in the acquired data, a range of possible values of an amplitude of the frequency component.

* * * * *